Figure 1:
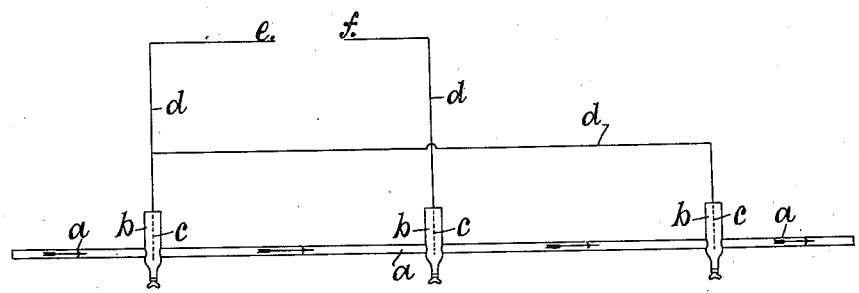

A. SHELMERDINE.
APPARATUS FOR THE STERILIZATION OF MILK.
APPLICATION FILED JUNE 9, 1913.

1,147,558.

Patented July 20, 1915.

Witnesses.

Inventor
A. Shelmerdine.
By ____ Atty.

UNITED STATES PATENT OFFICE.

ANTHONY SHELMERDINE, OF LIVERPOOL, ENGLAND.

APPARATUS FOR THE STERILIZATION OF MILK.

1,147,558.  Specification of Letters Patent. Patented July 20, 1915.

Application filed June 9, 1913. Serial No. 772,607.

*To all whom it may concern:*

Be it known that I, ANTHONY SHELMERDINE, subject of the King of England, residing at Liverpool, in the county of Lancaster, England, have invented new and useful Improvements in Apparatus for the Sterilization of Milk, of which the following is a specification.

This invention has reference to the sterilization of milk and cream, by the electric or electro-chemical process; and it has for its object to provide improvements in connection with this process, which renders the action desired, namely, complete sterilization, or sterilization such as can be safely relied on, assured.

In prior attempts to sterilize milk by the electric or electro-chemical method, it has been proposed to use an electric current, and to pass it through the liquid alternately in opposite directions, while the milk is flowing through the cell or apparatus in which it is being treated, and also to use currents of various degrees both in quantity and pressure but such pressure was comparatively low, such as 200 volts; and I have prior to the present time, carried out tests and experiments in this manner; but none of these modes of carrying out this process, either where the electrical method itself is used, or where the introduction of substances which on the current being passed through the milk produces antiseptic substances or media, have been effective for the reason that if the quantity of current is sufficient to destroy the pathogenic bacteria, the milk becomes changed in quality or character by the treatment; or, on the other hand, if the quantity of current is small, the sterilizing action is not effective.

To accomplish this end, I have conducted a great many tests of various kinds; and I have found that the problem of sterilizing milk presents special difficulties, as the bacteria must be destroyed, leaving the chemical composition of the milk unchanged, and it has been discovered, that to render them subject to the lethal effect of electricity, currents of abnormal voltages must be employed, namely, as high as from 2000 to 3000 volts, or more, as these voltages are necessary, apparently, to enable the current to act upon the bacteria, and destroy them. And the apparatus used consists of a tube of considerable length with electrodes at the ends, and an intermediate part, through which a current of 1½ kilowatts at a voltage of 3000 volts, alternating current, of about 50 periodicity, is transmitted, and by it, the destruction referred to was accomplished; but, of course, in different sizes of cells, the general ratio of current will have to be preserved.

Figure 2:
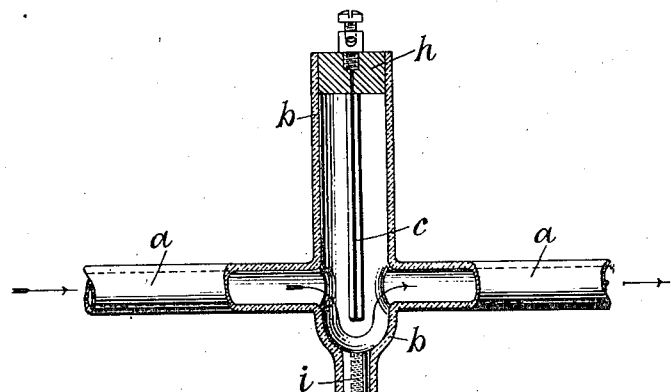
Figure 3:
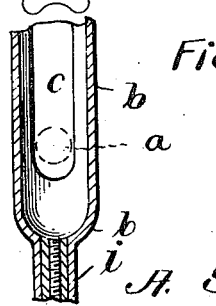

This apparatus is illustrated in the drawings, in which Figure 1 is a general elevation, and Fig. 2 is a detail. Fig. 3 is a detail showing the electrode.

$a$ is a cylindrical tube, say of glass and of about ⅞" to 1" diameter. Near the inlet and discharge ends and in the middle is an enlarged part $b$ in which the electrodes $c$ are placed, the distance apart of the parts $b$ being about 12" to 20"; and the alternating current passes through the milk flowing through the lengths of tube between them.

With regard to the distance apart of the electrodes, in order to control the current, and to establish and control the potential or voltage required, relatively large distances apart of the electrodes and lengths or dimensions of milk through which the current has to be transmitted, are very requisite or desirable.

$e$ and $f$ are the terminals of the conductors $d$ connected with the three electrodes $c$ which extend across the enlarged parts $b$, and a part of their surface is directly opposite to the bore of the tube $a$; and in flowing through these enlarged parts, the milk has to pass from one part of the tube to the next in a bent course owing to the presence of the electrode; that is, it takes a dip under the lower edge or around the side edges of each electrode.

The electrodes $c$ are fixed in the plugs $h$ in the parts $b$; and a screwed plug $i$ or tap is fitted in their lower parts so that they can be emptied when required.

Through the apparatus or cell shown—assuming the bore of the tube to be ⅞" diameter—an alternating current of about 1½ kilowatts at a voltage of about 3000 volts is transmitted between the second and first electrodes, and the second and third; the current passing through the milk between the second electrode $c$ and the two end ones, with the effect above described. And the quantity of milk that can be safely treated by the currents specified, is found to be about 10 gallons per hour. Nevertheless, it may be found safe, for the purpose of practical sterilization, to pass greater quantities than this; and in such a case the quantity of current employed may be the same as above specified, per unit of milk treated. In this cell, which is circular, or of other curved form, the milk being treated flows evenly through it; and there are no corners or angles where the milk can avoid being acted upon by the electrical action, and every part of the milk therefore, is uniformly subjected to it, and none can escape being so treated; with the result above described. The temperature of the milk should not be below about 50 degrees centigrade, and not above 60-65 degrees centigrade. This treatment may be carried out either on the milk alone or, if desired, in conjunction with the presence in the milk of a suitable body—say for example, a small proportion of common salt—which, while reducing the internal resistance of milk, as is known to electricians, assists in the destruction of bacteria and sterilization of the milk.

While the form and arrangements of parts described—and more particularly those set forth with reference to the drawings—effectively accomplish the objects specified, yet they may take other forms; as for example the tube $a$, instead of being straight, might be in the form of a U, or the like, or of other shape or form that may be convenient, also it can be arranged in multiple, in which case the apparatus would comprise a plurality of small tubes of sizes such as specified. Or, again, the tube or conduits through which the milk passes may be comparatively thin in one dimension, and broad or wide in the other, so as to constitute a relatively thin and broad way through the apparatus from electrode to electrode, or other suitable variation in size or shape.

What is claimed is:—

1. Apparatus for sterilizing milk or cream by electricity, comprising a tube of insulated material of small area in cross section, having its ends fully and freely open, through which the milk or cream flows, and being adapted to be filled by the milk or cream; a plurality of chambers on and extending across the ends of said tube; and an electrode centrally disposed in each of the said chambers and extending across the openings in the ends of the tube, whereby to cause a circuitous passage for the milk substantially as set forth.

2. Apparatus for sterilizing milk or cream by electricity, comprising a glass tube with enlarged chambers on the tube and electrodes disposed in the chambers and extending across the whole bore of the tube, and standing away from the ends thereof; and a passage around said electrodes constituting a bent passage for the milk or cream flowing through the tube and chambers; substantially as set forth.

In testimony whereof I have signed my name to this specification in the presence of two subscribing witnesses.

ANTHONY SHELMERDINE.

Witnesses:
ANDREW TAYLOR,
ROBERT WITTER.